(12) United States Patent
Stephenne et al.

(10) Patent No.: US 9,906,985 B2
(45) Date of Patent: Feb. 27, 2018

(54) METHOD AND DEVICE FOR SELECTING UPLINK DATA

(71) Applicants: Alex Stephenne, Kanata (CA); Philippe Leroux, Ottawa (CA); Aaron Callard, Ottawa (CA); Nimal Gamini Senarath, Ottawa (CA)

(72) Inventors: Alex Stephenne, Kanata (CA); Philippe Leroux, Ottawa (CA); Aaron Callard, Ottawa (CA); Nimal Gamini Senarath, Ottawa (CA)

(73) Assignee: Huawei Technologies Co., Ltd., Shenzhen (CN)

( * ) Notice: Subject to any disclaimer, the term of this patent is extended or adjusted under 35 U.S.C. 154(b) by 73 days.

(21) Appl. No.: 14/610,903

(22) Filed: Jan. 30, 2015

(65) Prior Publication Data

US 2016/0227564 A1   Aug. 4, 2016

(51) Int. Cl.
*H04W 72/12* (2009.01)
*H04W 28/24* (2009.01)
*H04W 72/04* (2009.01)

(52) U.S. Cl.
CPC .......... *H04W 28/24* (2013.01); *H04W 72/042* (2013.01); *H04W 72/12* (2013.01)

(58) Field of Classification Search
CPC ................................................ H04W 72/1268
See application file for complete search history.

(56) References Cited

U.S. PATENT DOCUMENTS

| 7,948,936 | B2* | 5/2011 | Lohr ................... H04L 12/5693 370/230 |
| 8,891,367 | B2* | 11/2014 | Cho .................. H04W 72/1236 370/230 |
| 8,971,903 | B2* | 3/2015 | Hossain .............. H04W 72/085 370/328 |
| 9,264,160 | B2 | 2/2016 | Yi et al. |
| 9,648,600 | B2* | 5/2017 | Stanwood .......... H04Q 11/0478 |
| 9,699,688 | B2* | 7/2017 | Horn ..................... H04L 47/824 |

(Continued)

FOREIGN PATENT DOCUMENTS

| CN | 101554078 A | 10/2009 |
| CN | 102356686 A | 2/2012 |

(Continued)

OTHER PUBLICATIONS

Dahlman, Erik et al., Section 13.2.1, "Uplink Priority Handling" (p. 325), "4G: LTE/LTE—Advanced for Mobile Broadband", Oct. 7, 2013 (4 pages).

(Continued)

*Primary Examiner* — Parth Patel

(57) ABSTRACT

Methods, devices and systems are provided for incorporating a consideration of the quality of service (QoS) of different end-to-end paths in a network, or portions thereof, into the scheduling of uplink data and the selection of data by a user device for transmission to one or more target reception points in a network. The target reception points may be determined from a number of possible reception points by a scheduling entity or by a network access node, gateway or other entity in the network and provided to a user device along with one or more indications of QoS for an uplink scheduling grant.

25 Claims, 5 Drawing Sheets

(56) References Cited

U.S. PATENT DOCUMENTS

| | | | |
|---|---|---|---|
| 2003/0103525 A1* | 6/2003 | Wahl | H04L 12/5693 370/465 |
| 2004/0233882 A1* | 11/2004 | Park | H04L 45/00 370/338 |
| 2005/0026624 A1* | 2/2005 | Gandhi | H04W 28/12 455/453 |
| 2005/0124372 A1* | 6/2005 | Lundby | H04W 52/146 455/522 |
| 2006/0092876 A1* | 5/2006 | Kwak | H04W 72/1226 370/329 |
| 2006/0092881 A1* | 5/2006 | Laroia | H04B 1/7097 370/331 |
| 2006/0153079 A1* | 7/2006 | Yoon | H04W 28/26 370/235 |
| 2006/0189320 A1* | 8/2006 | Usuda | H04L 47/10 455/452.2 |
| 2006/0215604 A1* | 9/2006 | Mueckenheim | H04W 72/1252 370/329 |
| 2007/0010281 A1* | 1/2007 | Sebire | H04L 67/325 455/525 |
| 2007/0038629 A1* | 2/2007 | Vinh | H04L 12/5695 |
| 2007/0047452 A1* | 3/2007 | Lohr | H04B 7/2612 370/242 |
| 2007/0177536 A1* | 8/2007 | Brueck | H04W 72/1268 370/328 |
| 2007/0183361 A1* | 8/2007 | Damnjanovic | H04W 74/004 370/328 |
| 2007/0242738 A1* | 10/2007 | Park | H04L 47/10 375/224 |
| 2007/0243879 A1* | 10/2007 | Park | H04L 41/0806 455/453 |
| 2007/0281695 A1* | 12/2007 | Lohr | H04W 72/1278 455/436 |
| 2007/0297360 A1* | 12/2007 | Joachim | H04W 52/50 370/329 |
| 2008/0049772 A1* | 2/2008 | Faniuolo | H04L 47/10 370/412 |
| 2008/0076432 A1* | 3/2008 | Senarath | H04W 36/24 455/442 |
| 2008/0102822 A1* | 5/2008 | Feng | H04W 72/082 455/425 |
| 2008/0207133 A1* | 8/2008 | Sato | H01Q 3/2605 455/67.11 |
| 2008/0227454 A1* | 9/2008 | Damnjanovic | H04W 36/0055 455/436 |
| 2009/0175214 A1* | 7/2009 | Sfar | H04B 7/15592 370/315 |
| 2009/0280849 A1* | 11/2009 | Rosen | H04L 12/5695 455/518 |
| 2010/0014422 A1* | 1/2010 | Lee | H04L 47/14 370/230 |
| 2010/0020760 A1* | 1/2010 | Grandblaise | H04B 7/2615 370/330 |
| 2010/0098006 A1* | 4/2010 | Golitschek Edler Von Elbwart | H04L 1/1861 370/329 |
| 2010/0135229 A1* | 6/2010 | Lohr | H04W 72/1284 370/329 |
| 2010/0202289 A1* | 8/2010 | Madan | H04L 5/0037 370/230 |
| 2010/0238882 A1 | 9/2010 | Zhang et al. | |
| 2010/0240385 A1* | 9/2010 | Lohr | H04W 36/0072 455/452.2 |
| 2010/0309867 A1* | 12/2010 | Palanki | H04L 5/0053 370/329 |
| 2011/0002304 A1* | 1/2011 | Lee | H04W 36/02 370/331 |
| 2011/0134829 A1* | 6/2011 | Chen | H04L 1/1854 370/328 |
| 2011/0183666 A1* | 7/2011 | Song | H04L 67/14 455/432.1 |
| 2011/0205993 A1* | 8/2011 | Cho | H04W 72/1236 370/329 |
| 2011/0310885 A1* | 12/2011 | Neisinger | H04L 41/5029 370/352 |
| 2012/0076103 A1* | 3/2012 | Dai | H04W 72/1289 370/329 |
| 2012/0089682 A1* | 4/2012 | Wu | H04W 28/24 709/206 |
| 2012/0236720 A1* | 9/2012 | Dominguez Romero | H04L 65/80 370/235 |
| 2012/0314685 A1* | 12/2012 | Chen | H04L 5/0057 370/329 |
| 2013/0084881 A1* | 4/2013 | Tang | H04L 12/1407 455/452.2 |
| 2013/0090127 A1* | 4/2013 | Nishikawa | H04W 72/082 455/452.1 |
| 2013/0201966 A1* | 8/2013 | Weng | H04W 72/04 370/336 |
| 2013/0242914 A1* | 9/2013 | Terry | H04L 1/0025 370/329 |
| 2013/0250770 A1* | 9/2013 | Zou | H04L 47/19 370/238 |
| 2013/0286988 A1* | 10/2013 | Zhang | H04L 47/12 370/329 |
| 2014/0036881 A1* | 2/2014 | Kim | H04L 5/001 370/336 |
| 2014/0056245 A1* | 2/2014 | Qin | H04W 36/0088 370/329 |
| 2014/0056278 A1* | 2/2014 | Marinier | H04W 72/044 370/330 |
| 2014/0086159 A1* | 3/2014 | Sajadieh | H04W 72/12 370/329 |
| 2014/0126517 A1* | 5/2014 | Choi | H04L 5/001 370/329 |
| 2014/0177573 A1 | 6/2014 | Han et al. | |
| 2014/0219104 A1* | 8/2014 | Senarath | H04L 41/0896 370/238 |
| 2014/0349633 A1* | 11/2014 | Sajadieh | H04W 8/18 455/418 |
| 2015/0319774 A1* | 11/2015 | Cai | H04W 72/14 370/329 |
| 2015/0327116 A1* | 11/2015 | Zhang | H04W 72/1284 370/329 |

FOREIGN PATENT DOCUMENTS

| | | | |
|---|---|---|---|
| CN | 102970761 A | | 3/2013 |
| KR | 20050022988 | | 3/2005 |
| WO | WO2016045702 | * | 3/2016 |

OTHER PUBLICATIONS

PCT International Search Report, PCT/IB2015/058795, dated Feb. 18, 2016, 11 pages.

* cited by examiner

METHOD AND DEVICE FOR SELECTING UPLINK DATA

TECHNICAL FIELD

The present disclosure relates to digital communications and more specifically, to methods and devices for selecting and transmitting data to a wireless communications network.

BACKGROUND

User equipment may be granted permission to transmit data to a wireless communications network using specified uplink resources and according to transmission parameters which may be provided by a base station, access point or other device which provides access to a network. The communications network also may schedule transmissions in order to support different quality of service levels for applications with different quality of service requirements for multiple user devices. Transmissions may be scheduled for multiple data flows per device each having different quality of service requirements. A quality of service level does not necessarily represent a quality of experience received by a user of a communications device.

SUMMARY

According to one embodiment of the present disclosure, there is provided a method for execution at a wireless device. The method includes receiving a grant conferring transmission rights associated with a wireless communications resource block (RB); receiving a plurality of quality of service (QoS) indicators, each of the plurality of QoS indicators associated with a transmission path associated with the conferred transmission rights; and transmitting data in the RB associated with the received grant, the transmitted data being selected in accordance with one of the received QoS indicators.

According to one embodiment of the present disclosure, there is provided a wireless device. The device includes a wireless communications interface; a processor; and one or more non-transitory computer readable media having computer readable instructions stored thereon which, when executed, direct the wireless device to receive a grant conferring transmission rights for a wireless communications resource block (RB); receive a plurality of quality of service (QoS) indicators, each of the plurality of QoS indicators associated with a transmission path associated with the conferred transmission rights; and transmit data in the RB associated with the received grant, the transmitted data being selected in accordance with one of the received QoS indicators.

According to one embodiment of the present disclosure, there is provided a method for scheduling transmissions in a communications network. The method includes determining a grant conferring transmission rights for a wireless communications resource block (RB); determining a plurality of quality of service (QoS) indicators, each of the plurality of QoS indicators associated with a transmission path associated with the conferred transmission rights; and transmitting the grant and the plurality of QoS indicators to a wireless devices.

According to one embodiment of the present disclosure, there is provided a scheduling entity. The scheduling entity includes a communications interface; a processor; and one or more non-transitory computer readable media having computer readable instructions stored thereon for transmitting and receiving data through the communications interface, the instructions, when executed by the processor, direct the scheduling entity to determine a grant conferring transmission rights for a wireless communications resource block (RB); determine a plurality of quality of service (QoS) indicators, each of the plurality of QoS indicators associated with a transmission path associated with the conferred transmission rights; and transmit the grant and the plurality of QoS indicators to a wireless device.

BRIEF DESCRIPTION OF THE DRAWINGS

Reference will now be made, by way of example, to the accompanying figures which show example embodiments of the present application, and in which.

Like reference numerals are used throughout the Figures to denote similar elements and features. While aspects of the invention will be described in conjunction with the illustrated embodiments, it will be understood that it is not intended to limit the invention to such embodiments.

DETAILED DESCRIPTION OF EXAMPLE EMBODIMENTS

Figure 1:
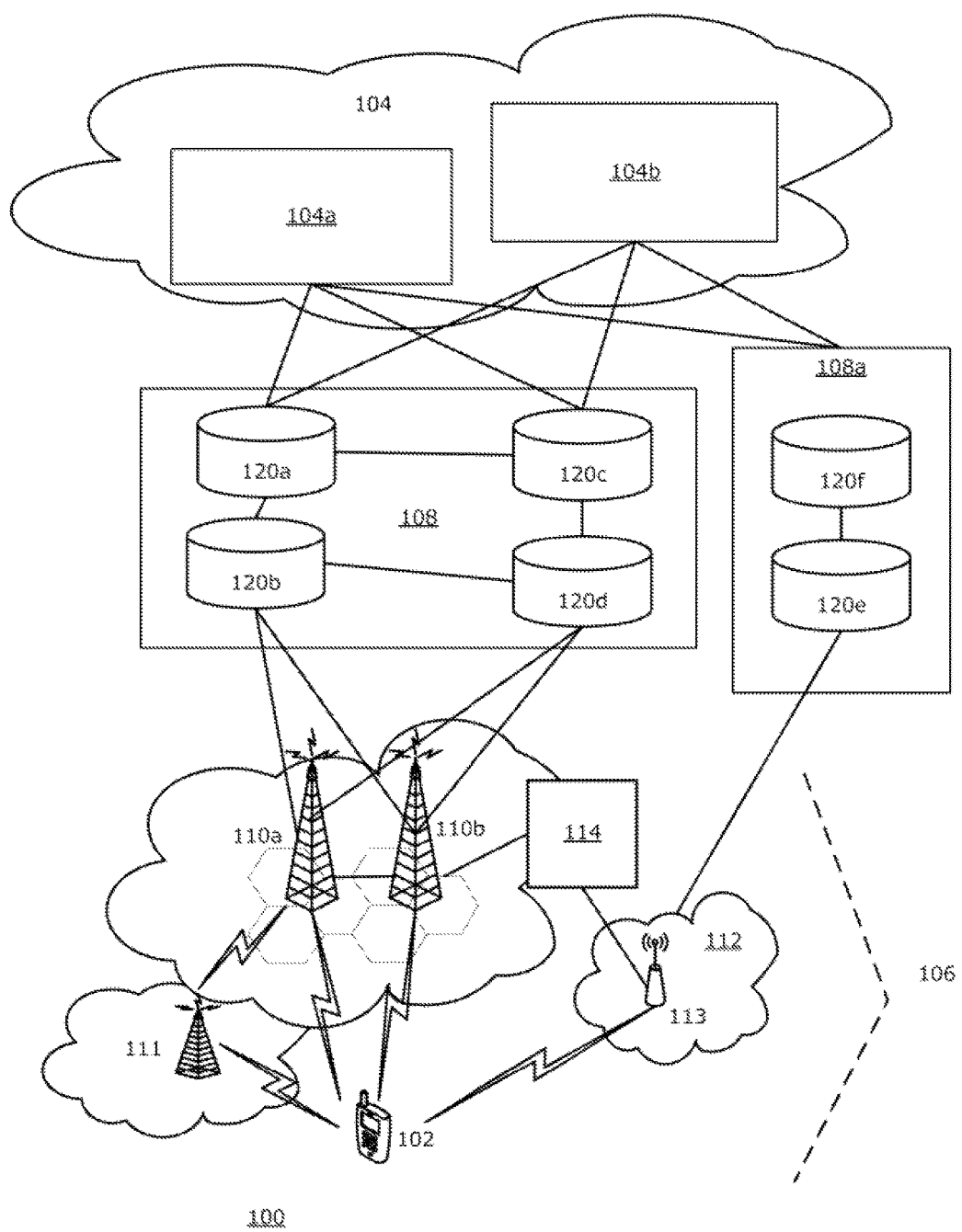
FIG. 1 is a block diagram illustrating a communications system in accordance with one implementation of the present disclosure.

The present disclosure teaches methods, devices and systems for incorporating a consideration of an estimated or possible quality of service (QoS) of different end-to-end paths in a network, or segments thereof, into the selection of data by a user device for transmission to one or more target reception points in a network. The target reception points and parameters for the data transmission may be determined from a number of possible reception points by a scheduling entity or by a network access node, gateway or other entity in the network. FIG. 1 provides a block diagram of a communications system 100 according to an embodiment of the present disclosure which enables various electronic devices to send and receive data. The communications system 100 may comprise wireless and wired portions. The communications system 100 may operate according to one or more technologies or standards including but not limited to Third Generation Partnership Project (3GPP) Long-Term Evolution (LTE), LTE Advanced, fourth generation (4G), or fifth generation (5G) telecommunications systems and other wireless or cellular communications systems.

The communications system 100 enables a wireless user device 102 to access a packet network such as an internet protocol (IP) network 104 through a radio access network (RAN) 106 and a packet network 108. The user device 102 is generally any wireless communications device capable of sending and receiving signals to and from the RAN 106, such as a user equipment (UE), wireless transmit/receive unit (WTRU), mobile station (MS), smartphone, cellular telephone or other wireless enabled computing or mobile device.

The RAN 106 may comprise a cloud or centralized radio access network (C-RAN) and operate according to one or more access technologies such as code division multiple access (CDMA), time division multiple access (TDMA), frequency division multiple access (FDMA), single-carrier FDMA (SC-FDMA) or orthogonal FDMA (OFDMA) and interface standards such as but not limited to an Enhanced Universal Mobile Telecommunications System (UMTS) Terrestrial Radio Access Network (E-UTRAN), UMTS and other such air interface standards. The RAN 106 may include different access links for receiving signals from a user device 102 including multiple network access nodes 110, such as access node 110a or access node 110b as illustrated in FIG. 1. Signals from a user device 102 also may be received through a radio relay unit (RRU) 111 or through a remote radio head (RRH) (not shown) with a wired connection to a network access node 110. In one embodiment, the RAN 106 includes a microcell, picocell, femto cell or small cell 112 with a micro network access node 113. The network access node 113 is referred to herein as a micro network access node 113 merely to indicate that this node may have a subset of the capabilities of the network access nodes 110a, 110b. The network access nodes 110a, 110b could be one of a base station (BS), evolved Node B (eNB) or access point (AP) or other device for providing wireless network services. In one embodiment, the micro network access node could be a home Node B or other device for providing wireless communications network services over a smaller area. The network access nodes 110, 113 may be viewed as reception points for the entry of data from the user device 102 into the communications system 100. The network access nodes 110a, 110b and micro network access node 113 may be connected via backhaul or wired connections.

In one embodiment, the communications system 100 includes a scheduling entity 114 which is configured to schedule the transmission or receipt of data between the user device 102 and one or more network access nodes 110a, 110b, 113. The scheduling entity 114 may be a separate component or it may be part of the network access node 110a, 110b, or part of another radio resource management or network device (not shown). In one embodiment, the scheduling entity 114 is configured to dynamically change the intended point of reception for signals from a user device 102. In some embodiments, the user device 102 may be configured to dynamically change the intended point of reception or access node 110.

The packet network 108 may comprise a packet core or evolved packet core (EPC). The packet network 108 includes one or more gateways 120, such as gateways 120a, 120b, 120c, 120d, which operate to route and forward data packets to the IP network 104. In one embodiment, the packet network 108 includes one or more serving gateways (SGW), packet data network gateways (PGW) and other functional entities such as a mobile management entity (MME), a home subscriber server (HSS), and a policy charging and resource function (PCRF) for controlling the flow of data packets from the user device 102 to the IP network 104. Where the communications system 100 includes a femto cell 112, additional gateways 120e, 120f in a packet network 108a may link the micro network access node 113 to the IP network 104. The micro network access node 113 may be in communication with the gateway 120e through a wired connection or through another network, such as the Internet or a service provider's network.

Depending on the service requested by a user, and/or subscription information for the user's account, different IP networks 104, as illustrated by IP networks 104a, 104b in FIG. 1, may be accessed. The IP networks 104a, 104b may represent an operator's IP services, a virtual private network, an external IP network, an IP multimedia subsystem (IMS) or other IP networks or services.

While FIG. 1 illustrates one user device 102, two network access nodes 110a, 100b, a micro network access node 113, and six gateways 120 with limited connections, it will be appreciated that the system 100 may support multiple user devices 102 which access the RAN 106 in numerous ways. The system 100 also may include multiple network access nodes 110, micro network access nodes 113 and gateways 120 with multiple backhaul connections configured over a geographical area to provide wireless communications services for various user devices 102.

In order to support different quality of service (QoS) levels for different types of traffic or application needs in the communications system 100, or for different service level agreements, different virtual connections or bearers may be established between end points in the network. A data flow for a particular application or service, such as video, voice over IP, web-browsing etc. may be mapped to a particular bearer depending on policies determined by the network operator. The mapping of a data flow to a particular bearer may occur at the entry to and exit from the network, that is, at the user device 102 and at a gateway 120 to the IP network 104. The mapping of each data flow may be based on traffic flow templates (TFTs) which contain filtering information to map each packet to a specific bearer based on information such as a source or destination address, network or service names, port numbers, protocol identifiers, or a combination thereof.

All data flows mapped to a particular bearer should receive the same packet forwarding treatment including the use of the same QoS parameters, maximum bit rate (for real time services), and allocation and retention priority (ARP). A bearer represents a logical path between a user device 102 and the gateway 120 leading to the IP network 104 and may be comprised of bearers which are created and linked or mapped between each component in the network. In one embodiment, in an LTE network for example, the bearer may be referred to as an Evolved Packet System (EPS) bearer and may be comprised of a radio bearer between the user device 102 and the network access node 110, an S1 bearer between the network access node 110 and an SGW, and an S5/S8 bearer between the SGW and a PGW. The term radio bearer will be used herein to describe simply a virtual connection for the transfer of data between the user device 102 and a network access node 110.

Each bearer may be associated with a different QoS class identifier (QCI) which may comprise a distinct profile of resource type (guaranteed bit rate (GBR) or non-guaranteed bit rate (Non-GBR)), priority, packet delay budget, packet error loss rate characteristics and other parameters to be used for the transport of data. Different applications and types of data may have different QoS requirements such that certain parameters or aspects of the service must be maintained at higher quality levels whereas other parameters are less important. For example, a data flow supporting a voice application may have stricter requirements in terms of packet delay budget whereas other data flows such as one supporting a video application may have stricter requirements in terms of packet error loss rate. In some networks, QCIs may be standardized with each QCI corresponding to a specific set of values, such as those set out in the 3GPP Technical Specification 23.203, Policy and charging control architecture, V.13.1.0 (2014-09), in order to ensure a minimum QoS is provided.

At least one bearer may be established when a user device 102 attaches to a network. Additional bearers may be established and/or modified at the request of the user device 102 or the system as different applications or traffic types require transmission to and from the user device 102 through the networks 106, 108. A user device 102 thus may have a number of radio bearers, with each bearer configured differently in order to support different traffic types such as signalling, voice over IP (VoIP), video or web browsing data.

While the QoS support for different paths in the networks 106, 108 is configured to attempt to meet the minimum QoS requirements for a particular bearer, the actual QoS support of end-to-end paths may vary greatly. For example, the wireless access link between the user device 102 and access node 110 may affect QoS. Depending on the interconnectivity between the network access nodes 110, micro network access node 113 and gateways 120 and resources available in these backhaul connections, the QoS may vary depending on the backhaul transmission path over which the data travels. The QoS provided for a particular bearer also may vary depending on which access node 110, 113 receives the uplink data and becomes the reception point for that uplink data into the network 106.

In one embodiment, a network entity is responsible for scheduling transmission of data from the user device 102 to the network 106 through the one or more access nodes 110a, 110b, 113. One skilled in the art will appreciate that this network entity may be local to any or all of the access nodes 110a, 110b or micro network access node 113 including an access node 110a, 110b, 113 engaged in joint reception. Scheduling of uplink transmissions can be done to determine which user device 102 should transmit data on a particular set of physical resource blocks in the wireless network and using a particular transport format. The scheduling process also may take into account QoS requirements so that they may be fulfilled. Scheduling may be further based on a number of factors and conditions, such as, but not limited to, varying channel conditions, available power, the number of user devices 102 and amount of data to be transmitted, QoS treatment for services, and maximizing cell throughput.

The network access node 110, 113 may receive scheduling requests from the user device 102 to initiate the uplink transmission of data, and buffer status reports (BSRs) regarding the amount of data that the user device 102 needs to transmit and the priority of that data. In order to reduce the amount of signalling overhead, the network access node 110, 113 may map each radio bearer to a logical channel group (LCG) based on the QoS attributes of the radio bearer, such as the QCI. Rather than the user device 102 signalling the amount of data it has to send for each particular radio bearer, the user device 102 may be configured to report the aggregate status of data buffers for data associated with radio bearers in one or more LCGs. Based on this information, and the network access node 110, 113 knowing the configuration of radio bearers in the LCGs, the network access node 110, 113 may schedule uplink transmissions by providing grants conferring transmission rights associated with a resource block to each user device 102. Grants may be provided dynamically for each transmission time interval (TTI) or on a persistent or semi-persistent basis in which resources are allocated at predetermined intervals for an extended basis, such as to support VoIP calls. In one embodiment, the network access node 110a can transmit scheduling information to any subset of user devices 102 connected to that network access node 110a. In one embodiment, the network access node 110a can respond only to the user devices 102 which request uplink resources. Alternatively, the network access node 110a can send scheduling information to user devices 102 that requested uplink resources from the network access node 110b. Further, it will be appreciated that the network access node 110a may perform a mix of these functions.

In one embodiment, the scheduling entity 114 or multiple joint scheduling entities 114 are responsible for scheduling the transmission of data from the user device 102 to the network 106 through the one or more access nodes 110a, 110b or micro access node 113. The scheduling entity 114 may comprise a separate component or it may be part of another radio resource management or network device (not shown), or part of the network access node 110. The scheduling entity 114 determines, as described above, the provision of scheduling grants to multiple user devices 102 in order to meet QoS requirements. In one embodiment, the scheduling entity 114 receives buffer status report information from the multiple access nodes 110, 113. Scheduling grant information is then communicated to one or more of the access nodes 110a, 110b, 113 for the use in providing scheduling grants to user devices 102. In one example, the access node 110a, 110b or 113 with the lowest path loss to the user device 102 may be assigned to send the scheduling grant. The scheduling entity 114 may operate jointly with other scheduling entities 114 or network access nodes 110. A traffic engineering module (not shown) may inform the scheduling entity 114 of the percentage of traffic which should be received by each reception point, that is by the network access nodes 110a, 110b, and micro network access node 113.

In response to a grant conferring transmission rights, the user device 102 may prioritize data for transmission to a network access node 110, 113 in accordance with various techniques, such as the logical channel prioritization procedures set out the 3GPP Technical Specification 36.321, Medium Access Control (MAC) protocol specification V.12.3.0 (2014-09). The user device 102 may transmit data from the logical channel for the highest priority radio bearer up to a prioritized bit rate (PBR) to ensure that at least a small amount of uplink resources are available for lower priority traffic.

Figure 2:
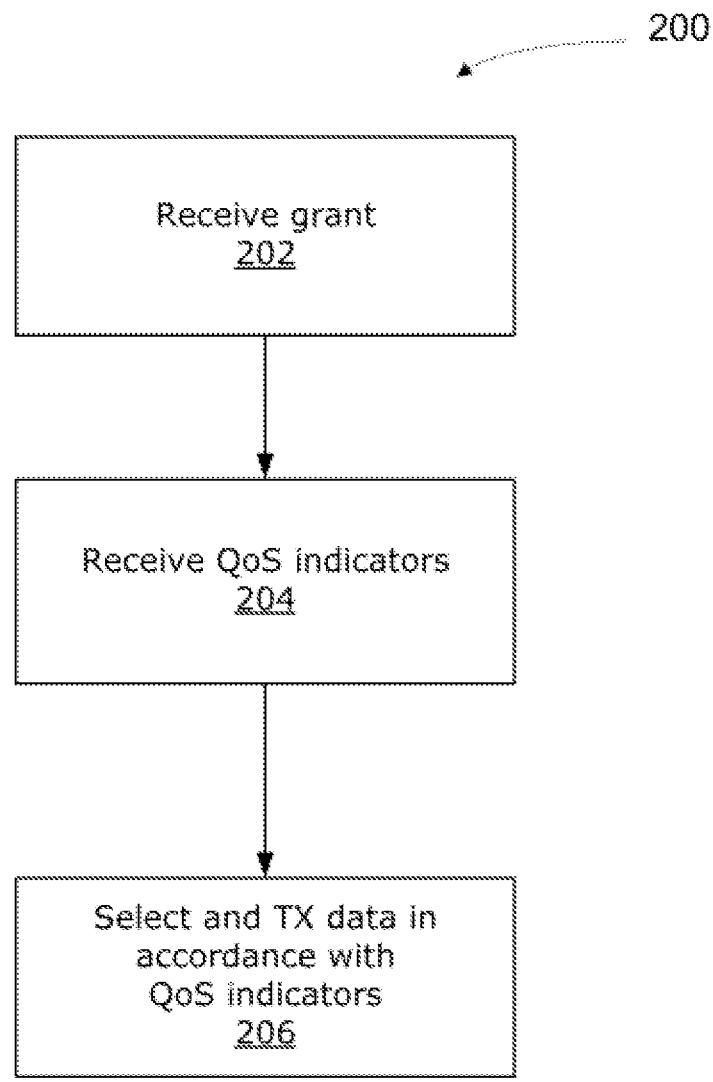
FIG. 2 is a block diagram illustrating a method in accordance with one implementation of the present disclosure.

FIG. 2 illustrates a method 200 of selecting and transmitting data from a user device 102 to a communications system 100 according to an embodiment of the present invention. The method includes receiving a grant (Action 202) which confers transmission rights associated with a wireless communications RB. The grant may be received from a network access node 110a, 110b, or micro network access node 113 for the transmission of data to the network 106. The grant may be received from the network access node 110 which is granting the network resources or, if joint scheduling is supported, the grant may be received from a network access node 110a, for the transmission of data to one or more network access nodes 110a, 110b, or micro network access node 113. In one embodiment, the grant includes an indication of the resource blocks that will be available to the user device 102 and the transmission parameters to be used by the user device 102 to ensure proper reception at the intended or target reception point, such as network access nodes 110a, 110b, or micro network access node 113. Such transmission parameters may include a transmit power level, a modulation and coding scheme (MCS) and precoder information.

The method 200 includes the user device 102 receiving a plurality of QoS indicators (Action 204), each of the plurality of QoS indicators is associated with a transmission path associated with the conferred transmission rights. In one embodiment, the plurality of QoS indicators is received as part of the grant. The QoS indicators provide information about the QoS which is expected or estimated to be supported by each path associated with the possible reception points, such as the one or more network access nodes 110 or micro network access node 113, listening for a transmission from the user device 102 for the particular grant. In one embodiment, the QoS indicator reflects the QoS estimated for the next uplink transmission based on the transmission parameters and the target network access nodes for that uplink transmission, as well as other network states, such as, but not limited to, buffer statuses (head of queue delay, dropping rate, buffer sizes etc.), links utilizations, types of traffic including number of packets and packet sizes. In one embodiment, the QoS indicator is indicative of the estimated quality of service for a portion of the path or a network segment which forms part of an end-to-end path from the user device 102 through the intended or target point of reception to an intended IP network 104a, 104b, such as a segment between the network access node 110, 113 and a network gateway 120. The network segment may be a path from a target access node 110, or target micro network access node 113 to the destination of the uplink data, such as but not limited to an IP network 104a, 104b, or a second user device 102 in communication with the target network access node 110, 113. In one embodiment the network segment is the full end-to-end path from a user device 102 to the destination of the uplink data. In one embodiment the network segment is the wireless access link portion of the path to a target network access node.

In some embodiments, the QoS indicators do not provide a guarantee of a particular QoS level for the transmission of data in the RB associated with the received grant but the QoS indicators allow the user device 102 to select data for transmission in accordance with the estimated or possible QoS for that transmission. As illustrated in the non-limiting examples described herein, where data is selected for transmission based on an estimated or possible QoS, the QoE may be improved. In some embodiments, such as where the end-to-end path from the user device 102 to the destination of the transmitted data is within a service provider's network, or within a group of managed networks, the QoS indicators may be used as a guarantee of service at a particular level.

Each QoS indicator may include one or more parameters indicative of the estimated quality of service for the scheduled transmission, such as but not limited to, an expected delay, jitter, maximum delay over a particular window, packet loss rate or a probability of a delay over a particular threshold. In one embodiment, each QoS indicator comprises an integer representing a group of parameters with particular values or ranges of values. Such QoS indicators may be predefined for the communications system 100 and remain static or be updated dynamically by the network access node 110, 113 or the scheduling entity 114 based on radio resource control (RRC) signalling. In another embodiment, instead of receiving a separate QoS indicator from the network access node 110, 113 the user device 102 is configured to determine a QoS indicator based on the transmission parameters set for the grant. The determination of this QoS indicator also could be predefined for different sets and values of parameters and remain static or be dynamically updated.

Where the user device 102 has data pending transmission for multiple data flows, which are destined for different IP networks 104a, 104b, a QoS indicator may be provided for each data flow and the paths available between the user device 102, the intended or target point of reception, and each IP network 104a, 104b. In one embodiment the user device 102 may receive a plurality of grants with each grant being associated with a different wireless reception point. Each of the grants may be associated with a QoS indicator which reflects the estimated QoS for a transmission path associated with the grant and the possible or target reception point. The QoS indicator may reflect the estimated QoS from the user device 102 over a wireless access link to the reception point, the estimated QoS from that reception point to an IP network 104a, or the estimated QoS along the entire end-to-end path. In another embodiment, a received plurality of grants may be associated with one possible or target reception point. In that case, each grant may be associated with a QoS indicator which reflects the estimated QoS for a transmission path associated with each grant, which may vary with the scheduling of data transmissions and parameters specified for transmissions in each resource block. In one embodiment, the received plurality of QoS indicators may indicate the estimated QoS for a number of unique or different backhaul transmission paths available from a target or possible reception point.

Based on the QoS indicators, data is selected for transmission in the resource block associated with the (Action 206). Data may be selected from a particular category of data such as voice, video, text, ftp or html data. The data may be one associated with a particular radio bearer which has data awaiting transmission to the network 106. Whereas one approach involves the allocation of data for transmission on the basis of the user device 102 determining a priority, in one embodiment the method 200 allows the user device 102 to attempt to find a best match between QoS requirements for queued data and one or more QoS indicators for the scheduling grant. The QoS indicator may provide an indication of an estimated QoS level or ceiling such that traffic which is preferably transmitted at that QoS level or lower may be selected for transmission. Where none of the QoS indicators match the QoS requirements for queued data a best or closest match may be found in order to transmit data. In one embodiment, a grant with a low QoS indicator may be used by the user device 102 to transmit best-effort data. In one embodiment, the QoS indicator comprises a recommended data category or radio bearer for the user device 102 to transmit based on the estimated QoS expected for that transmission. The recommended data category or radio bearer may not be followed by the user device 102, in particular, for example, when data for a different radio bearer becomes ready to send after a buffer status report is sent and before a grant is received.

In one embodiment, a plurality of cost indicators may be received along with the plurality of QoS indicators. Each cost indicator may be associated with a QoS indicator and reflect an estimated cost of a transmission at a particular estimated QoS level. Data may then be selected by the user device 102 based on the QoS indicator and the cost indicator. The cost indicator may comprise an integer representing a particular cost, or ranges or relative cost value. Such cost indicators may be predefined for the communications system 100 and remain static or be updated dynamically by the network access node 110, 113 or the scheduling entity, or by a traffic engineering module.

The method 200 may further include transmitting the data for receipt by an intended or target network access node 110, 113. Where joint scheduling is supported, grants may be received by the user device 102 from one network access node 110a and data may be transmitted to an intended or target network access node 110b, or to target access nodes 110a and 110b. In some embodiments, the data selected for transmission is sent using as many resource blocks as needed. In other embodiments, data is sent by the user device 102 up to a PBR or other basis in order to ensure that other categories of data are not starved for transmission resources. In one embodiment, uplink data may be detected at and routed from multiple network access nodes 110, 113 and QoE may be enhanced by a user device 102 dynamically sending a particular category or bearer of data to an appropriate network access node 110, 113 based on the QoS indicators.

In one embodiment, the method 200 further includes receiving multiple sets of possible transmission parameters which may be used for the transmission of uplink data over the physical or wireless resource of a grant and multiple corresponding QoS indicators. The user device 102 may then determine the set of transmission parameters to be used along with the data for transmission based on the QoS indicators. The determined set of transmission parameters may be sent to the network access node 110, 113 separately or along with the transmitted uplink data.

While the scheduling of uplink transmissions and handling of different traffic types according to different bearers in the network may be aimed at achieving a particular QoS level, this may not provide the best quality of experience (QoE) for a user of a device 102. QoE refers to a user's satisfaction or experience with services received through the user device 102. QoE may vary depending on a number of factors including, but not limited to, a user's subjective expectations, the type of application being used and the type of data being sent, and delays or performance of a network over time. QoE may vary from QoS, for example, where a service provided at an overall quality level encounters disruptions at key times or for particular or key data which disproportionately affect the perceived quality of service. By providing a QoS indicator to a user device 102 and the user device 102 considering the QoS when selecting different traffic types for transmission, QoE may be enhanced. For example, if the QoS indicator signals a poor error rate may be encountered for the transmission path associated with the conferred transmission rights, a slightly larger amount of audio data may be selected for transmission in order to ensure some audio data is transmitted through the network, with the recipient of the data encountering a glitch rather than silence.

In the case where a user device 102 may be transmitting data through a micro network access node 113 and through a network access node 110b, the micro network access node 113 may have a backhaul path through a shared internet connection. The quality of that backhaul path may fluctuate based on use by other devices whereas the network access node 110b may be part of a network with a backhaul path engineered for its traffic. If a user device 102 is supporting a video conference service, comprised of voice and video data flows, a grant with a QoS indicator may allow the user device 102 to select the voice data flow for transmission through the network access node 110b. QoE thus may be improved over existing user devices which would otherwise select the voice data flow for transmission through the first available grant.

Figure 3:
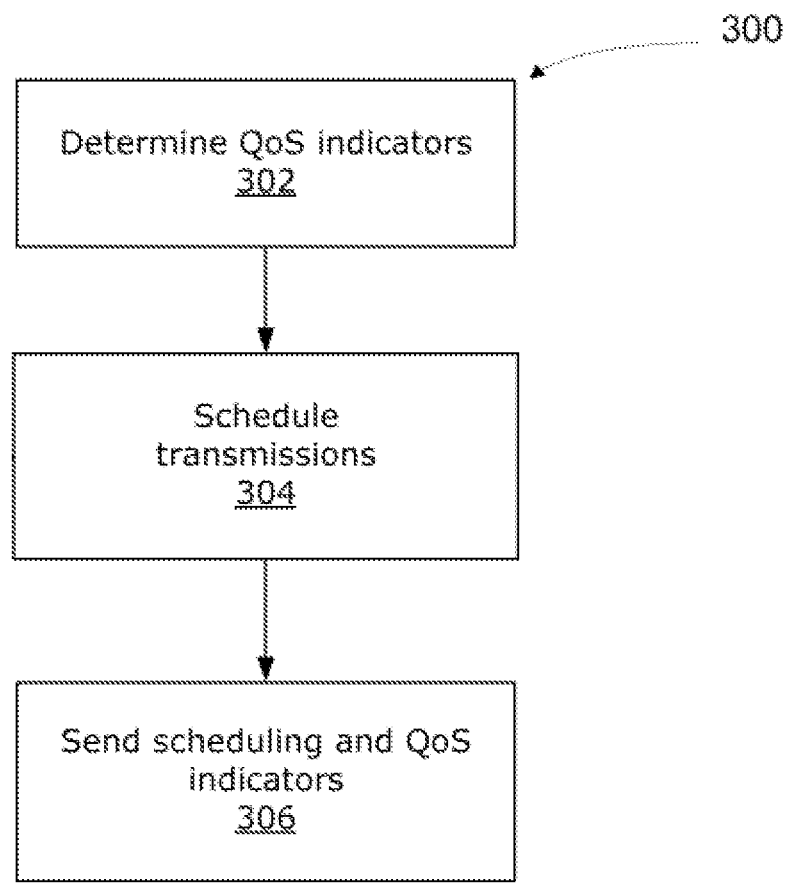
FIG. 3 is a block diagram illustrating a method in accordance with one implementation of the present disclosure.

FIG. 3 illustrates a method 300 of determining QoS indicators and scheduling uplink transmissions from a user device 102 according to an embodiment of the present invention. The method 300 may be performed by a network entity such as the scheduling entity 114. In some embodiments, the method 300 is performed by the network access node 110, or by the micro network access node 113, or by a combination of these entities. The method includes determining a plurality of QoS indicators associated with a transmission path associated with the conferred transmission rights for the grant. As described above, the QoS indicator may reflect an estimated QoS for an end-to-end path available from the user device 102 through one or multiple target points of reception to the IP networks 104a, 104b, or end point of the data transmission, or network segments thereof. Each QoS indicator may include one or more parameters indicative of the estimated quality of service for each resource block in a plurality of grants. In one embodiment, the QoS indicators are determined by a traffic engineering module in the communications system 100 and are provided to the network access node 110, 113 or scheduling entity 114. The traffic engineering module may be part of the network access node 110 or scheduling entity 114. The traffic engineering module may inform the network access node 110, micro network access node 113, and/or scheduling entity 114 of the percentage of traffic which should be received by each network access node 110a, 110b and/or micro network access node 113 along with QoS indicators for paths from each network access node 110a, 110b and micro network access node 113.

In some embodiments, where multiple network access nodes 110a, 110b are engaged in coordinated multipoint reception with joint processing, the QoS indicator may include an additional estimated delay associated with this feature. Specifically, this may include receiving one or more QoS indicators from a traffic engineering module for each of the multiple network access nodes 110a, 110b engaged in coordinated multipoint reception with joint processing. A single QoS indicator for the multipoint transmission may then be determined based on the multiple QoS indicators and an estimated delay due to the coordinated multipoint reception with joint processing. In one embodiment, this single QoS indicator is determined by the scheduling entity 114 and sent to the user device 102 through one of the network access nodes 110a, 110b. In another embodiment, the QoS indicators and the estimated delay due to the multipoint reception with joint processing are provided to the user device 102 and the user device 102 is configured to determine the single QoS indicator and also determine the data to be transmitted when using joint processing.

In another embodiment, any or all of the network access node 110a, 110b, micro network access node 113, or scheduling entity 114, or the traffic engineering module may be configured to determine QoS indicators dynamically, such as by sounding or pinging paths in the network in order to determine an expected end-to-end delay. The determination of QoS indicators may be based on historical data of past performance of the network or a combination of historical data and dynamic testing. The determination of QoS indicators also may include a consideration of the quality of service capabilities of the wireless access link between a user device 102 and each target network access node 110, 113. The determination of QoS indicators also may include a consideration of the loading of the target network access nodes 110, 113. In one embodiment, the QoS indicators are determined periodically in order to track time varying QoS capabilities associated paths in the network. In one embodiment, the QoS indicator may include additional estimated delays associated with a single node advanced receiver, such as multi-user MIMO (MU-MIMO) with successive interference cancellation (SIC) where data from one user device 102 may not be decidable until data from a different user device 102 is successfully decoded.

The method 300 includes scheduling uplink transmissions (Action 304) which may include scheduling uplink data. The uplink scheduling and the plurality of QoS indicators may be sent to a wireless device through one or more network access nodes 110 or and micro network access node 113 (Action 306). The uplink scheduling information may be sent by the scheduling entity 114 to one or more network access nodes 110, and micro network access nodes 113 or, where the scheduling entity functionality is part of a network access node 110a, from the network access node 110a to one or more network access nodes 110b and micro network access node 113. In one embodiment, the scheduling of uplink transmissions or data includes a consideration of QoS indicators for potential paths from each access node 110a, 110b, or micro network access node 113 to a target IP network 104a, 104b or other uplink data destination in order to schedule the most appropriate user device 102 with data for the QoS capabilities associated with paths from the intended reception points. Based on the uplink scheduling, the one or more network access nodes 110, or micro network access node 113 generate and transmit uplink grants and associated QoS indicators to user devices 102. In order to minimize signalling overhead, in some embodiments, the QoS indicator is provided along with a persistent or semi-persistent scheduling grant. In some embodiments, the QoS indicator is provided in the context of dynamic bearer reception point selection with relatively slow adaptation such that the QoS of paths available from different network access nodes 110a, 110b or micro network access node 113 may be considered. The method 300 may further include a network access node 110 or micro network access node 113 receiving data from a user device 102 which has been selected for transmission based on the QoS indicator associated with the grant. The data may or may not correspond to a recommended data category or radio bearer provided by the network access node 110. Thus, data may be received by a network access node 110 which may be better suited to the QoS available through that reception point.

Figure 4:
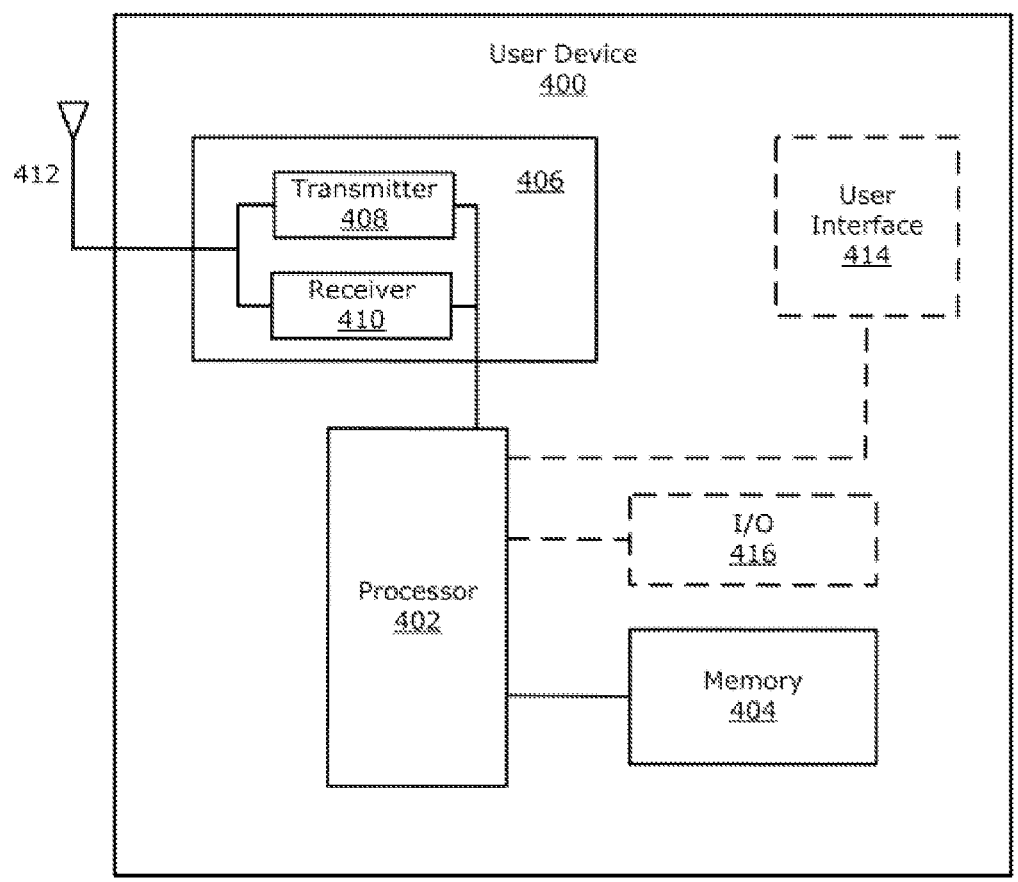
FIG. 4 is a block diagram illustrating a user device in accordance with one implementation of the present disclosure.

FIG. 4 illustrates a user device 400 according to an embodiment of the present application. As indicated above, the user device 400 is generally any device capable of providing wireless communications to the RAN 106 such as a user equipment (UE), wireless transmit/receive unit (WTRU), mobile station (MS), smartphone, cellular telephone or other wireless enabled computing or mobile device. The user device 400 may include a processor 402, a memory 404, and a wireless communications interface 406 for sending and receiving data over the communications system 100, which components may or may not be arranged as shown in FIG. 4. The wireless communications interface 406 includes a transmitter 408 and receiver 410 coupled to an antenna 412. It will be appreciated that the functions of the wireless communications interface 406 may be carried out by different transceiver or modem components including multiple transmitter, receiver and antenna components or arrays. In one embodiment, the user device 400 includes a user interface 414 which may include various inputs/outputs 416 such as a display, audio input and output, keys, buttons, microphones or other inputs or outputs. The memory 404 may store programming and/or instructions for the processor 402 including instructions for scheduling, sending, receiving, processing and displaying different services and types of data, such as but not limited to video, VoIP calls, web browsing data, email and other text communications.

The user device 400 may be configured to receive and respond to grants for the transmission of uplink data to a network access node 110 and to support the methods described above and illustrated in FIG. 2. The user device 400 may be configured to receive a grant from a network access node 110 for the transmission of data from the user device 102 to a communications system 100 and to receive QoS indicators associated with one or more network access nodes 110, and/or micro network access node 113 for the scheduling grant. Based on the QoS indicators associated with the grant, the device 400 may determine and select data to transmit in the resource block associated with the grant. In one embodiment, as described above, the device 400 is configured to also receive multiple sets of possible transmission parameters which may be used for the transmission of uplink data and determine the set of transmission parameters to be used along with the data for transmission based on the QoS indicators. In one embodiment, as described above, the device 400 is configured to also receive multiple cost indicators and select and transmit data based on the QoS indicators and associated cost indicators.

Figure 5:
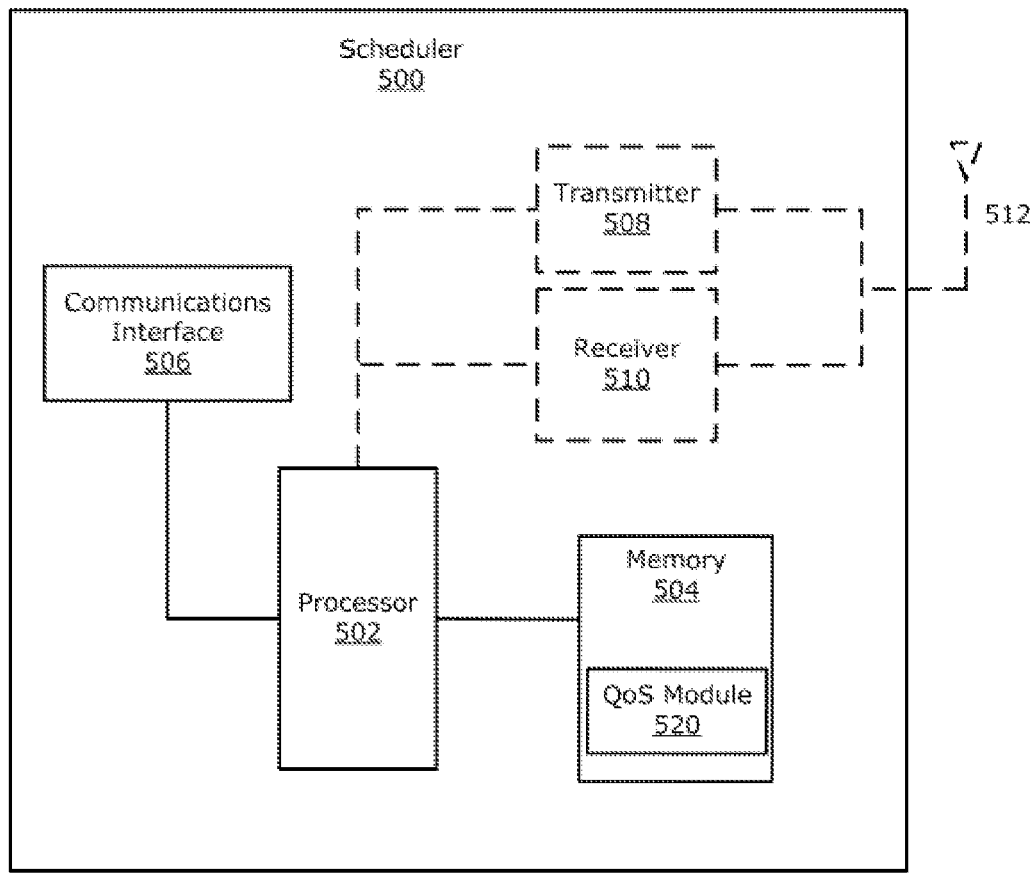
FIG. 5 is a block diagram illustrating a scheduling entity in accordance with one implementation of the present disclosure.

FIG. 5 illustrates a scheduling entity 500 according to an embodiment of the present application. The scheduling entity 500 may comprise a processor 502, a memory 504, a communications interface 506 for sending and receiving data to a network gateway 120 and/or to network access nodes 110, such as through a wired connection. The memory 504 may store programming and/or instructions for the processor 502 including a QoS module 520 comprising instructions for implementing and supporting the methods described above and illustrated in FIG. 3. In some embodiments, the scheduling entity 500 supports coordinated multipoint reception and transmission (CoMP) including CoMP with joint signal processing for uplink data. In one embodiment, the scheduling entity 500 includes a traffic engineering module as described above.

In one embodiment, the scheduling entity 500 comprises one of a network access node such as a base station (BS), evolved Node B (eNB), access point (AP), femto cell, or combination thereof, for operating in the RAN 106. When configured as a network access node, the scheduling entity 500 includes a wireless communications interface for transmitting scheduling grants to user devices 102, 400, as represented in FIG. 5 by a transmitter 508 and receiver 510 coupled to an antenna 512. It will be appreciated that the functions of the wireless communications interface may be carried out by different transceiver or modem components including multiple transmitter, receiver and antenna components or arrays. The memory 504 may store programming and/or instructions for the processor 502 including instructions for sending and receiving different categories of data to and from a user device 102, 400 and to/from a network gateway 120.

Through the descriptions of the preceding embodiments, the present invention may be implemented by using hardware only, or by using software and a necessary universal hardware platform, or by a combination of hardware and software. Based on such understandings, the technical solution of the present invention may be embodied in the form of a software product. The software product may be stored in a non-volatile or non-transitory storage medium, which can be a compact disk read-only memory (CD-ROM), USB flash drive, or a hard disk. The software product includes a number of instructions that enable a computer device (personal computer, server, or network device) to execute the methods provided in the embodiments of the present invention.

Although the present invention and its advantages have been described in detail, it should be understood that various changes, substitutions and alterations can be made herein without departing from the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A method for execution at a wireless device, comprising:
receiving a grant conferring transmission rights associated with a wireless communications resource block (RB);
receiving information representing a plurality of quality of service (QoS) indicators, each of the plurality of QoS indicators associated with a respective one of a plurality of transmission paths associated with the conferred transmission rights, at least one of the plurality of QoS indicators representing path delay of at least a portion of a respective transmission path, the plurality of transmission paths defining different end-to-end paths via different backhaul connections through different network nodes; and
transmitting selected data in the RB associated with the received grant, the selected data being selected from among a plurality of data, each having respective QoS requirements, buffered for transmission at the wireless device, the selected data being selected over other data buffered into one or more transmission data queues by matching QoS requirements of the selected data with one of the QoS indicators.

2. The method of claim 1 wherein receiving the grant includes receiving a plurality of grants, the plurality of grants being associated with a plurality of different wireless reception points.

3. The method of claim 2 wherein each of the plurality of grants is associated with a respective QoS indicator in the plurality of QoS indicators and transmitting selected data includes selecting which data among the plurality of data buffered for transmission to transmit in the RB associated with which of the received plurality of grants, each respective selected data being selected for transmission in a respective RB over other data buffered for transmission by matching QoS requirements of each selected data with the QoS indicator associated with each grant.

4. The method of claim 1 wherein receiving the grant includes receiving a plurality of grants, each grant in the plurality of grants being associated with a same wireless reception point.

5. The method of claim 4, wherein each of the plurality of grants is associated with a respective QoS indicator in the plurality of QoS indicators and transmitting selected data includes selecting which data among the plurality of data buffered for transmission to transmit in the RB associated with which of the received plurality of grants, particular data being selected for transmission in a particular RB over other data buffered for transmission by matching QoS requirements of each selected data with the QoS indicator associated with each grant.

6. The method of claim 1 wherein each of the plurality of QoS indicators includes an additional estimated delay for coordinated multipoint reception with joint processing.

7. The method of claim 1 wherein each of the plurality of QoS indicators comprises a recommended category of data to transmit in the RB, the category of data being a media type of the data, and wherein the selected data is selected over other data buffered for transmission by matching the selected data with the recommended category of data.

8. The method of claim 1 further comprising receiving a plurality of cost indicators, each of the plurality of cost indicators being associated with one of the plurality of QoS indicators, wherein the selected data is selected over other data buffered for transmission in accordance with one of the received QoS indicators and associated cost indicator.

9. The method of claim 1 wherein receiving the grant further comprises receiving multiple sets of transmission parameters, each set of transmission parameters associated with one of the plurality of QoS indicators, the method further comprising transmitting a selected set of transmission parameters to be used for transmission of the selected data, wherein the selected set of transmission parameters is selected in accordance with one of the received QoS indicators.

10. A wireless device comprising:
a wireless communications interface;
a processor; and
one or more non-transitory computer readable media having computer readable instructions stored thereon which, when executed, direct the wireless device to:
receive a grant conferring transmission rights for a wireless communications resource block (RB);
receive information representing a plurality of quality of service (QoS) indicators, each of the plurality of QoS indicators associated with a respective one of a plurality of transmission paths associated with the conferred transmission rights, at least one of the plurality of QoS indicators representing path delay of at least a portion of a respective transmission path, the plurality of transmission paths defining different end-to-end paths via different backhaul connections through different network nodes; and
transmit selected data in the RB associated with the received grant, the selected data being selected from among a plurality of data, each having respective respective QoS requirements, buffered for transmission at the wireless device, the selected data being selected over other data buffered into one or more transmission data queues by matching QoS requirements of the selected data with one of the QoS indicators.

11. The wireless device of claim 10 wherein the computer readable instructions when executed, further direct the device to:
receive a plurality of grants, the plurality of grants being associated with a plurality of different wireless reception points,
wherein each of the plurality of grants is associated with a respective QoS indicator in the plurality of QoS indicators, and
wherein each respective selected data is selected for transmission in the RB associated with each of the received plurality of grants, over other data buffered for transmission, by matching QoS requirements of each selected data with the QoS indicator associated with each grant.

12. The wireless device of claim 10 wherein the computer readable instructions when executed, further direct the device to:
receive a plurality of grants, each grant in the plurality associated with a same wireless reception point,
wherein each of the plurality of grants is associated with a respective QoS indicator in the plurality of QoS indicators, and
wherein each respective selected data is selected for transmission in the RB associated with each of the received plurality of grants, over other data buffered for transmission, by matching QoS requirements of each selected data with the QoS indicator associated with each grant.

13. A method, for execution at a network access node, of scheduling transmissions in a communications network, comprising:
determining a grant conferring transmission rights for a wireless communications resource block (RB);
determining a plurality of quality of service (QoS) indicators, each of the plurality of QoS indicators associated with a respective one of a plurality of transmission paths associated with the conferred transmission rights, at least one of the plurality of QoS indicators representing path delay of at least a portion of a respective transmission path, each of the plurality of QoS indicators providing information to enable selection of data, from among a plurality of data each having respective QoS requirements, for transmission over the associated transmission path, the plurality of transmission paths defining different end-to-end paths via different backhaul connections through different network nodes; and
transmitting the grant and the plurality of QoS indicators to a wireless device.

14. The method of claim 13 further comprising determining a plurality of grants, the plurality of grants being associated with a plurality of different wireless reception points, wherein each of the plurality of grants is associated with a respective QoS indicator in the plurality of QoS indicators.

15. The method of claim 13 further comprising determining a plurality of grants, each grant in the plurality of grants being associated with a same wireless reception point, wherein each of the plurality of grants is associated with a respective QoS indicator in the plurality of QoS indicators.

16. The method of claim 13 wherein determining the grant comprises determining the grant associated with multiple wireless reception points engaged in coordinated multipoint reception with joint processing and wherein determining each of the plurality of QoS indicators comprises including an additional estimated delay for the joint processing.

17. The method of claim 13 wherein determining each of the plurality of QoS indicators comprises pinging end points in the network to determine expected transmission delays.

18. The method of claim 13 wherein determining each of the plurality of QoS indicators is based on a quality of service capability from the wireless device to a wireless reception point and loading of the wireless reception point.

19. The method of claim 13 wherein transmitting the grant and the plurality of QoS indicators to a wireless device comprises a scheduling entity transmitting the grant and the plurality of QoS indicators to one or more wireless reception points, and one of the one or more wireless reception points transmitting the grant and the plurality of QoS indicators to the wireless device.

20. A scheduling entity at a network access node, the scheduling entity comprising:
a communications interface;
a processor; and
one or more non-transitory computer readable media having computer readable instructions stored thereon for transmitting and receiving data through the communications interface, the instructions, when executed by the processor, direct the scheduling entity to:
determine a grant conferring transmission rights for a wireless communications resource block (RB);
determine a plurality of quality of service (QoS) indicators, each of the plurality of QoS indicators associated with a respective one of a plurality of transmission paths associated with the conferred transmission rights, at least one of the plurality of QoS indicators representing path delay of at least a portion of a respective transmission path, each of the plurality of QoS indicators providing information to enable selection of data, from among a plurality of data each having respective QoS requirements, for transmission over the associated transmission path, the plurality of transmission paths defining different end-to-end paths via different backhaul connections through different network nodes; and
transmit the grant and the plurality of QoS indicators to a wireless device.

21. The scheduling entity of claim 20 wherein the computer readable instructions when executed, further direct the scheduling entity to determine a plurality of grants, the plurality of grants being associated with a plurality of different wireless reception points, wherein each of the plurality of grants is associated with a respective QoS indicator in the plurality of QoS indicators.

22. The scheduling entity of claim 20 wherein the computer readable instructions when executed, further direct the scheduling entity to determine a plurality of grants, each grant in the plurality of grants being associated with a same wireless reception point, wherein each of the plurality of grants is associated with a respective QoS indicator in the plurality of QoS indicators.

23. The scheduling entity of claim 20 wherein the scheduling entity is directed to transmit the grant and plurality of QoS indicators to the wireless device by transmitting the grant and the plurality of QoS indicators to one or more wireless reception points for transmission to the wireless device.

24. The scheduling entity of claim 20 further comprising a wireless reception point having a wireless communications interface and where in the grant and the plurality of QoS indicators are transmitted to the wireless device through the wireless communications interface.

25. The scheduling entity of claim 20 wherein the computer readable instructions when executed, further direct the scheduling entity to determine the plurality of QoS indicators by receiving the plurality of QoS indicators from a traffic engineering entity.

* * * * *